United States Patent
Wei et al.

(10) Patent No.: US 11,054,860 B2
(45) Date of Patent: Jul. 6, 2021

(54) ELECTRONIC APPARATUS HAVING SECOND SCREEN AND CONTROL METHOD THEREOF

(71) Applicants: Jen-Ting Wei, Taipei (TW); Chen-Cheng Wang, Taipei (TW); Chun-Chieh Chen, Taipei (TW)

(72) Inventors: Jen-Ting Wei, Taipei (TW); Chen-Cheng Wang, Taipei (TW); Chun-Chieh Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/417,676

(22) Filed: May 21, 2019

(65) Prior Publication Data

US 2019/0361489 A1 Nov. 28, 2019

Related U.S. Application Data

(60) Provisional application No. 62/676,250, filed on May 24, 2018.

(51) Int. Cl.
*G06F 1/16* (2006.01)

(52) U.S. Cl.
CPC .............. *G06F 1/165* (2013.01); *G06F 1/162* (2013.01); *G06F 1/1626* (2013.01); *G06F 1/1694* (2013.01)

(58) Field of Classification Search
CPC ........ G06F 1/165; G06F 1/162; G06F 1/1626; G06F 1/1694
See application file for complete search history.

(56) References Cited

U.S. PATENT DOCUMENTS

| | | | | |
|---|---|---|---|---|
| 5,896,575 A | * | 4/1999 | Higginbotham | G06F 1/16 455/557 |
| 7,206,196 B2 | * | 4/2007 | Ghosh | G06F 1/162 248/917 |
| 8,289,688 B2 | * | 10/2012 | Behar | G06F 1/162 361/679.3 |

(Continued)

FOREIGN PATENT DOCUMENTS

| | | |
|---|---|---|
| TW | 201523337 | 6/2015 |
| TW | I579732 | 4/2017 |
| TW | I587120 | 6/2017 |

OTHER PUBLICATIONS

"Office Action of Taiwan Counterpart Application", dated Feb. 21, 2020, p. 1-p. 10.

*Primary Examiner* — Dmitriy Bolotin
(74) *Attorney, Agent, or Firm* — JCIPRNET

(57) ABSTRACT

An electronic apparatus having a second screen and a control method thereof are provided. A first screen of the electronic apparatus displays main content; the second screen displays, for instance, a logo, a notification message, or other information. To observe display content on the second screen in a positive direction, in response to a body of the electronic apparatus flipping or rotating, a display image on the second screen is rotated correspondingly. Besides, to obtain simple information, e.g., weather, temperature, current time, etc., or activate a specific function, in response to a default trigger operation, the second screen can display corresponding simple information or content of the function. When the first screen is in a full-screen mode, if the notification message is received, the second screen displays content corresponding to the notification message, so that the first screen can continue displaying the content in the full-screen mode without being affected.

10 Claims, 13 Drawing Sheets

(56) References Cited

U.S. PATENT DOCUMENTS

| | | | |
|---|---|---|---|
| 9,746,883 B2* | 8/2017 | Lee | G06F 1/1641 |
| 2005/0062715 A1* | 3/2005 | Tsuji | G06F 1/1671 |
| | | | 345/158 |
| 2005/0063149 A1* | 3/2005 | Shimamoto | G06F 1/162 |
| | | | 361/679.06 |
| 2005/0243021 A1* | 11/2005 | Perez | G06F 1/1613 |
| | | | 345/1.3 |
| 2006/0161278 A1* | 7/2006 | Maeda | H04M 1/0227 |
| | | | 700/94 |
| 2007/0085759 A1* | 4/2007 | Lee | H04M 1/57 |
| | | | 345/1.1 |
| 2007/0254729 A1* | 11/2007 | Freund | H04M 1/0216 |
| | | | 455/575.3 |
| 2009/0244832 A1* | 10/2009 | Behar | G06F 1/1677 |
| | | | 361/679.55 |
| 2009/0303205 A1* | 12/2009 | Seibert | G06F 1/1694 |
| | | | 345/204 |
| 2010/0007603 A1* | 1/2010 | Kirkup | G06F 1/1616 |
| | | | 345/158 |
| 2011/0012858 A1* | 1/2011 | Brookes | G06F 1/162 |
| | | | 345/173 |
| 2013/0222208 A1* | 8/2013 | Gorilovsky | G09G 3/2096 |
| | | | 345/1.1 |
| 2013/0321244 A1* | 12/2013 | Ono | G09F 9/301 |
| | | | 345/1.3 |
| 2013/0321340 A1* | 12/2013 | Seo | G06F 1/1647 |
| | | | 345/174 |
| 2014/0101576 A1* | 4/2014 | Kwak | G06F 3/0482 |
| | | | 715/761 |
| 2014/0101578 A1* | 4/2014 | Kwak | G06F 3/04883 |
| | | | 715/761 |
| 2014/0152576 A1* | 6/2014 | Kim | G06F 1/1677 |
| | | | 345/169 |
| 2014/0152695 A1* | 6/2014 | Ishiwata | G09G 5/14 |
| | | | 345/629 |
| 2014/0210737 A1* | 7/2014 | Hwang | H04M 1/0243 |
| | | | 345/173 |
| 2015/0212545 A1* | 7/2015 | Ding | G06F 1/1647 |
| | | | 345/168 |
| 2016/0292820 A1* | 10/2016 | Kuan | G06F 3/1446 |
| 2017/0168594 A1* | 6/2017 | Tsuji | G06F 1/1616 |
| 2017/0365041 A1* | 12/2017 | Matsumoto | G06F 1/1616 |
| 2018/0321892 A1* | 11/2018 | Kim | G06F 1/1618 |
| 2019/0042066 A1* | 2/2019 | Kim | G06F 1/1618 |

\* cited by examiner

ELECTRONIC APPARATUS HAVING SECOND SCREEN AND CONTROL METHOD THEREOF

CROSS REFERENCE TO RELATED APPLICATION

This application claims the priority benefit of U.S. provisional application Ser. No. 62/676,250, filed on May 24, 2018. The entirety of the above-mentioned patent application is hereby incorporated by reference herein and made a part of specification.

BACKGROUND

Technical Field

The disclosure relates to an electronic apparatus; more particularly, the disclosure relates to an electronic apparatus having a second screen and a control method of the electronic apparatus.

Description of Related Art

A portable electronic apparatus is easy to carry and can be used for instantly receiving and processing information by a user, and the portable electronic apparatus has thus gradually become one of the indispensable tools for modern people. Common portable electronic apparatuses include smart phones, tablet PCs, notebook computers, and so on. Most of these portable electronic apparatuses are printed with brand logos for consumers to intuitively identify these apparatuses. However, most logos have the one-way design in a positive direction. The text corresponding to the brand name is taken as an example, and the consumers can only observe the forward font in a specific orientation, and the text observed in other orientations is in a reverse font, which is not conducive to consumer identification.

On the other hand, in the past, when the notebook computer is being used, if the user intends to actively obtain simple information (for instance, weather, temperature, time, etc.), it is necessary to wake up the main screen to view or click on a specific web page for further search. In terms of usage experience, even if it is only for obtaining the simple information, the operation steps are a bit cumbersome. Additionally, when the user intends to wake up a built-in voice assistant, it is often required to activate the function by clicking on a specific window or by voice call. In terms of usage experience, the activation steps are also cumbersome, and the machine may not be able to perform identification due to a slip of the tongue.

SUMMARY

In view of the above, according to one or more embodiments of the disclosure, an electronic apparatus having a second screen and a control method of the electronic apparatus are provided, wherein an image on the second screen can be rotated according to a flipping state of a body of the electronic apparatus, so that a logo can be displayed in a positive direction, and the second screen can display different content through simple operations.

In an embodiment of the disclosure, an electronic apparatus including a first body and a second body, a first screen and a second screen, a posture detector, and a processor is provided. The second body is movably connected to the first body. The second screen and the first screen are disposed on one side of the first body. The posture detector is disposed at the first body and configured to detect a flipping state of the first body relative to the second body. The processor is coupled to the first screen, the second screen, and the posture detector. The processor changes a display image on the second screen according to the flipping state.

According to an embodiment of the disclosure, the processor rotates the display image on the second screen if the flipping state is that an included angle is changed. The included angle exists between the one side of the first body where the second screen is disposed and one side of the second body.

According to an embodiment of the disclosure, when the included angle within a range of the first angle is changed to be within a range of a second angle, the processor rotates the display image on the second screen by 180 degrees. The range of the first angle and the range of the second angle are not overlapped. When the included angle within the range of the second angle is changed to be within the range of the first angle, the processor rotates the display image on the second screen by 180 degrees.

According to an embodiment of the disclosure, the posture detector further detects a rotation state of the first body on an imaginary plane. The imaginary plane is parallel to the one side of the first body where the second screen is disposed. If the flipping state is that an included angle is a rotation trigger angle, the processor determines whether there is a change of direction to the rotation state. The included angle exists between the one side of the first body where the second screen is disposed and one side of the second body. When there is the change of direction to the rotation state, the processor rotates the display image on the second screen.

According to an embodiment of the disclosure, the electronic apparatus further includes a motion detector. The motion detector is coupled to the processor, disposed at the second body, and configured to detect a trigger operation triggered by an external force. The processor changes the display image on the second screen according to the trigger operation.

According to an embodiment of the disclosure, the processor determines content of the display image on the second screen according to at least one of operating time and operating number of times of the trigger operation.

According to an embodiment of the disclosure, when receiving a notification message, the processor displays the notification message on the second screen according to a display mode of the first screen. The display mode is associated with a size of a display program image.

In another embodiment of the disclosure, a control method adapted to an electronic apparatus is provided. The control method includes following steps. A first screen, a second screen, a first body, and a second body are provided. The first body can be movably connected to second body, and the first screen and the second screen are disposed on one side of the first body. A flipping state of the first body relative to the second body is detected. A display image on the second screen is changed according to the flipping state.

According to an embodiment of the disclosure, the step of changing the display image on the second screen according to the flipping state includes following steps: The display image on the second screen is rotated if the flipping state is that an included angle is changed. The included angle exists between the one side of the first body where the second screen is disposed and one side of the second body.

According to an embodiment of the disclosure, the step of changing the display image on the second screen according to the flipping state includes following steps. The display image on the second screen is rotated by 180 degrees when the flipping state is that the included angle within a range of a first angle is changed to be within a range of a second angle. The range of the first angle and the range of the second angle are not overlapped. When the included angle within the range of the second angle is changed to be within the range of the first angle, the display image on the second screen is rotated by 180 degrees.

According to an embodiment of the disclosure, the step of changing the display image on the second screen according to the flipping state includes following steps. A rotation state of the first body on an imaginary plane is determined. The imaginary plane is parallel to the one side of the first body where the second screen is disposed. If the flipping state is that an included angle is a rotation trigger angle, it is determined whether there is a change of direction to the rotation state. The included angle exists between the one side of the first body where the second screen is disposed and one side of the second body. When there is the change of direction to the rotation state, the display image on the second screen is rotated.

According to an embodiment of the disclosure, the control method further includes the following steps. A trigger operation triggered by an external force is detected. The display image on the second screen is changed according to the trigger operation.

According to an embodiment of the disclosure, the step of changing the display image on the second screen according to the trigger operation includes following steps. Content of the display image on the second screen is determined according to at least one of operating time and operating number of times of the trigger operation.

According to an embodiment of the disclosure, the control method further includes the following steps. A notification message on the second screen is displayed according to a display mode of the first screen when receiving the notification message. The display mode is associated with a size of a display program image.

In light of the foregoing, according to the electronic apparatus and the control method thereof provided in one or more embodiments, the display image on the second screen can be rotated according to the flipping state or the rotation state of the body of the electronic apparatus where the second screen is disposed, so that the display image can face a viewer in a positive direction. The display image on the second screen can also be changed by an external trigger operation. Besides, when the electronic apparatus receives the notification messages including emails or messages, if the display mode of the first screen is a full-screen mode, a maximized window mode, and so on, the notification messages can be displayed on the second screen. A user can thus receive the notification instantly, and the operation performed by the user is not affected.

To make the above features and advantages provided in one or more of the embodiments of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
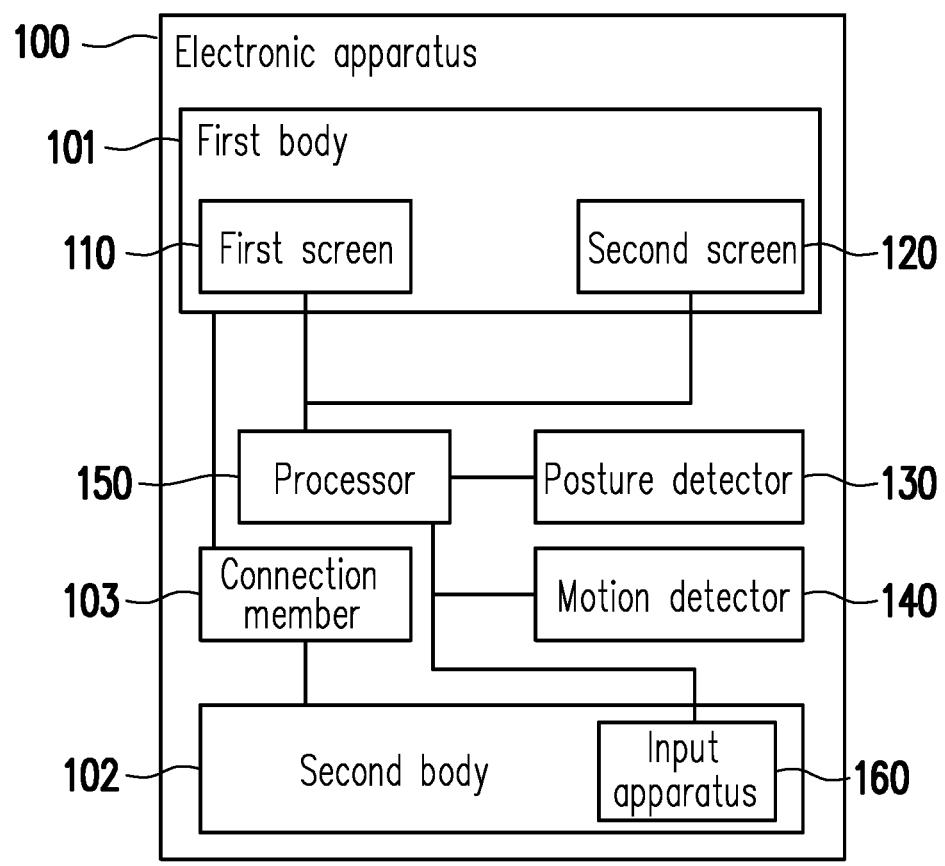
FIG. 1 is a block diagram of an electronic apparatus according to an embodiment of the disclosure.

FIG. 1 is a block view of devices of an electronic apparatus 100 according to an embodiment of the disclosure. With reference to FIG. 1, the electronic apparatus 100 includes but is not limited to a first body 101, a second body 102, a connection member 103, a first screen 110, a second screen 120, a posture detector 130, a motion detector 140, a processor 150, and an input apparatus 160. The electronic apparatus 100 can be a notebook computer, a mobile phone, a tablet PC, and so forth.

Figure 2A:
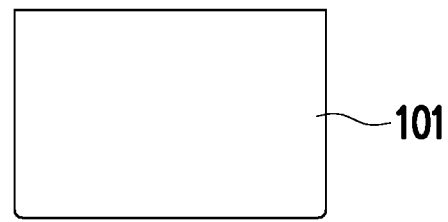
FIG. 2A to FIG. 2D are schematic views of a flipping action of a body according to an embodiment of the disclosure.
Figure 2A:
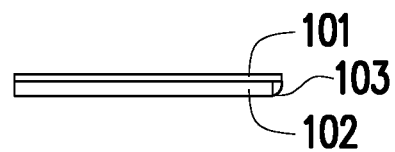
Figure 2B:
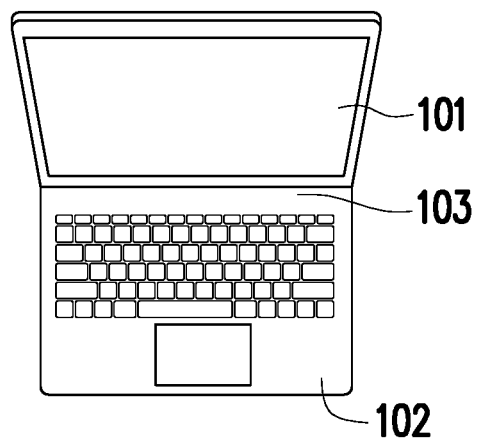
Figure 2B:
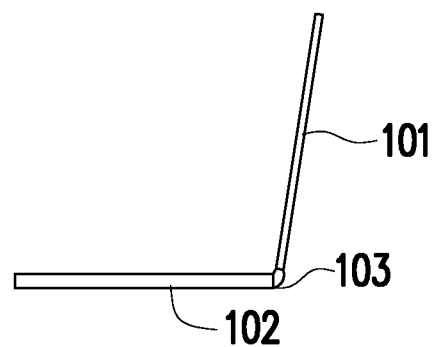

FIG. 2A to FIG. 2D are schematic views of a flipping action of a body according to an embodiment of the disclosure. With reference to FIG. 2A to FIG. 2D, the first body 101 is movably connected to the second body 102 through the connection member 103. The connection member 103 can be a hinge cover configured to accommodate a biaxial hinge mechanism. In the present embodiment, the first body 101 can be flipped relative to the second body 102. As shown in FIG. 2A, the first body 101 and the second body 102 are closed, and the first screen 110 and the second screen 120 are blocked. As shown in FIG. 2B, the first body 101 is flipped with respect to the connection member 103 as an axial center, so as to expose the first screen 110 and the second screen 120. Based on different design requirements, the flipping state of the first body 101 relative to the second body 102 may be similar to the open state shown in FIG. 2C or FIG. 2D.

In other embodiments, note that the connection member 103 may also be another pivoting mechanism, e.g., a rotation axle mechanism. Besides, the notebook computer shown in FIG. 2A to FIG. 2D is merely exemplary, and people implementing the embodiment can apply the same to other electronic apparatuses based on actual demands.

Figure 3A:
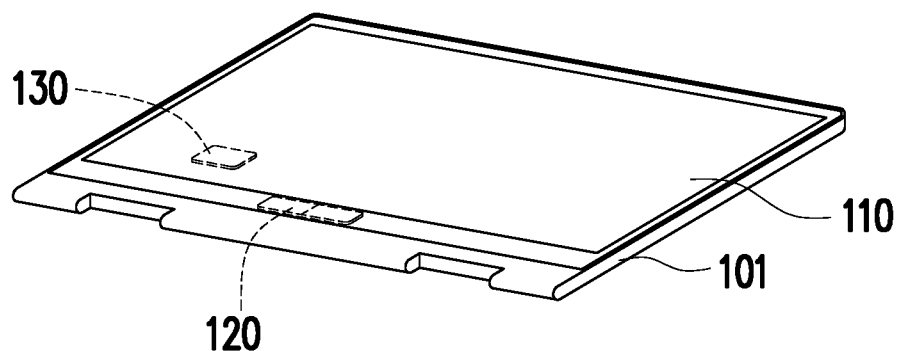
FIG. 3A to FIG. 3C are schematic views of a first body according to an embodiment of the disclosure.
Figure 3B:
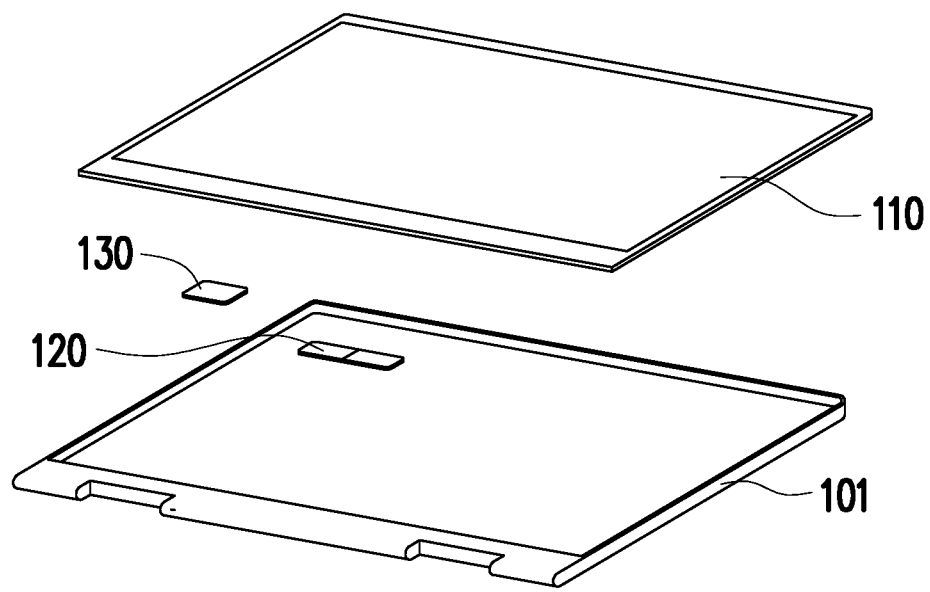
Figure 3C:
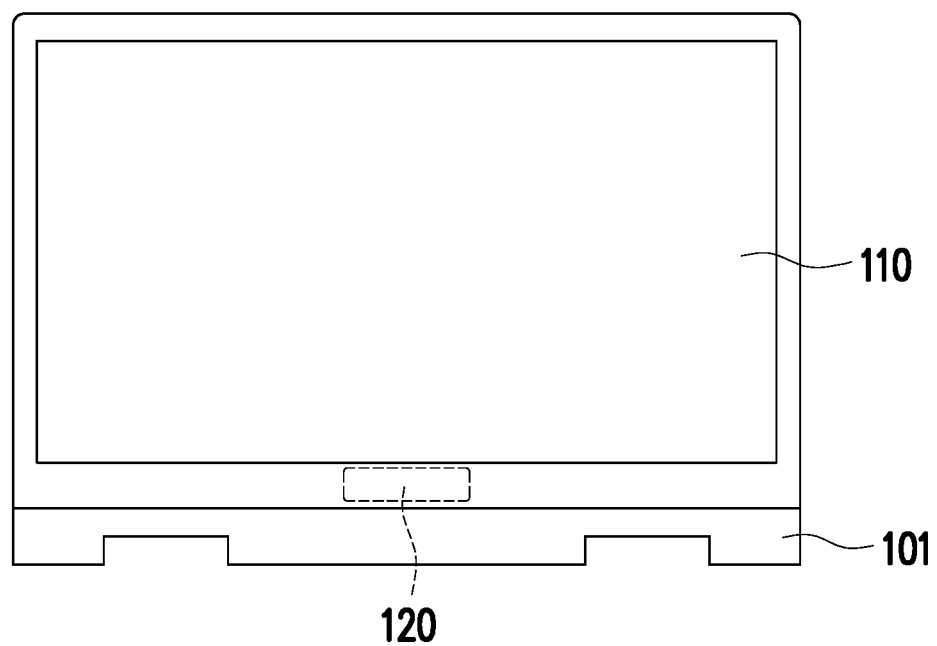

The first screen 110 and the second screen 120 can be liquid crystal displays (LCDs), light-emitting diode (LED) displays, organic light-emitting diode (OLED) displays, or displays of other types. FIG. 3A to FIG. 3C are schematic views of the first body 101 according to an embodiment of the disclosure. With reference to FIG. 3A to FIG. 3C, the notebook computer is taken as an example, and the first screen 110 and the second screen 120 are disposed on one side of the first body 101 (side B as shown in the drawings).

That is, a user is able to simultaneously observe the display image on the first screen 110 and the second screen 120 on the first body 101. The size of the second screen 120 may be smaller than the size of the first screen 110, and the second screen 120 is located below the first screen 110 shown in FIG. 3C. The first screen 110 is configured to display a main image of an operating system, and the second screen 120 is configured to display specific information, such as a specific logo, a message, a shortcut, a virtual hot key, and so on. Namely, the content of the display images on the two screens 110 and 120 is different.

In other embodiments, it should be mentioned that the location, the size, the shape, and the display content of the first screen 110 and the second screen 120 may be different from those shown in FIG. 3C and can be adjusted according to the user's demands.

The posture detector 130 can be a G-sensor, an accelerometer, an inertial sensor, a gyroscope, a magnetometer, or a combination thereof and is configured to detect a movement state or posture, such as acceleration, angular velocity, orientation, and the like. With reference to FIGS. 3A and 3B, in the present embodiment, the posture detector 130 is disposed at the first body 101 and configured to detect the flipping state (as the vertical flipping state shown in FIG. 2B to FIG. 2D) and the rotation state (oriented to the reference clockwise or counterclockwise rotation state shown in FIG. 3C) of the first body 101, which will be elaborated in following embodiments.

Figure 4A:
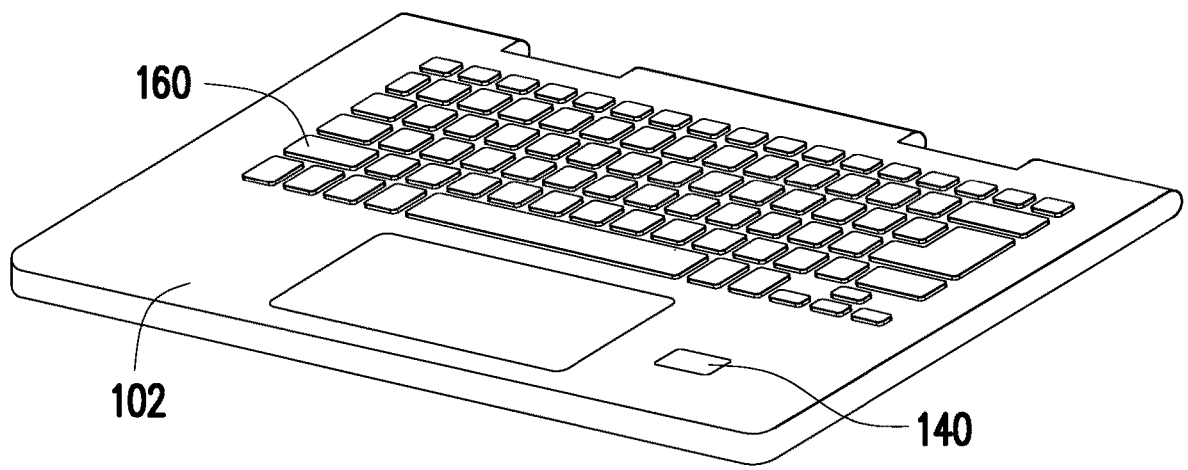
FIG. 4A and FIG. 4B are schematic views of a second body according to an embodiment of the disclosure.
Figure 4B:
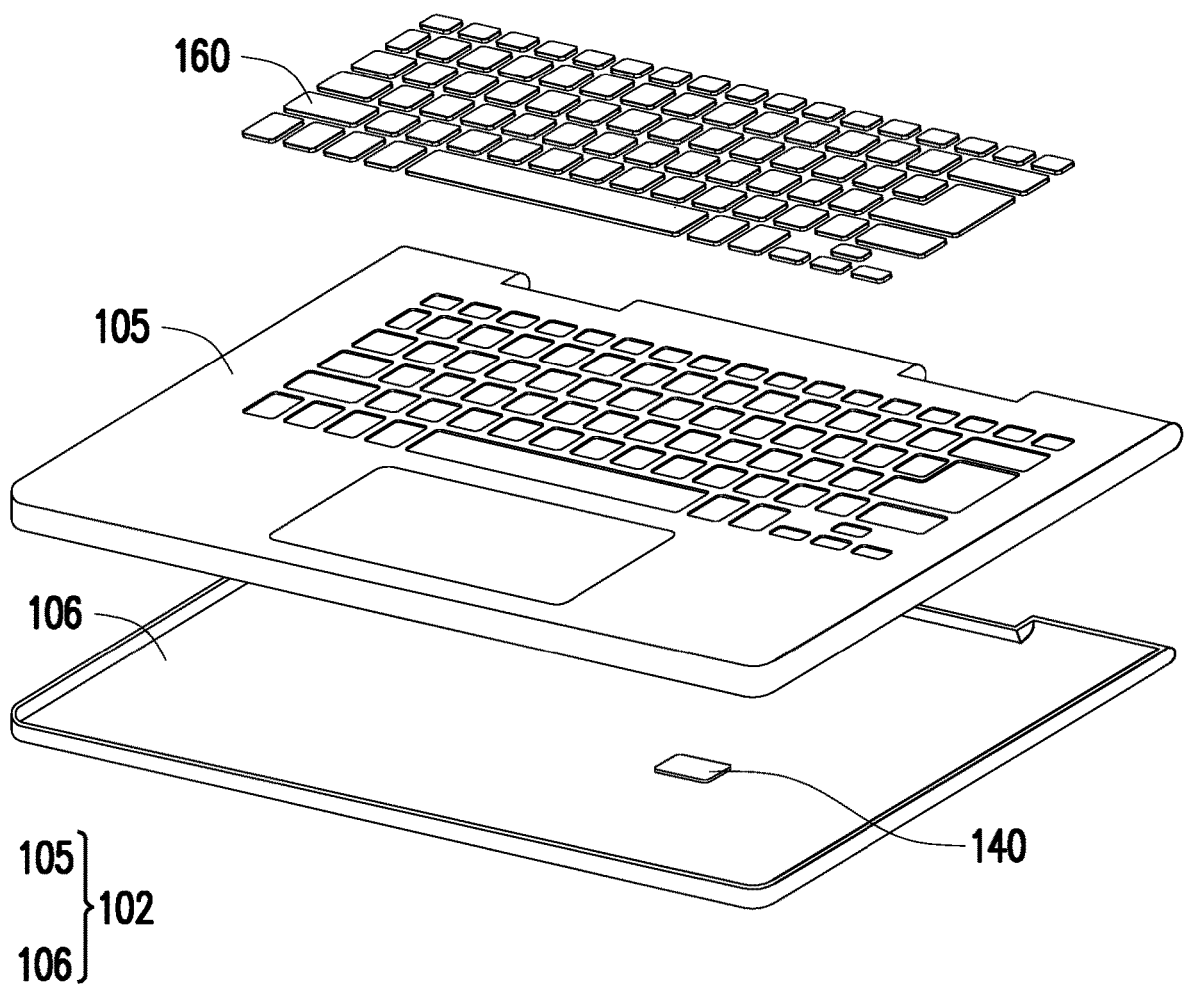

The motion detector 140 can be a vibration sensor, a touch switch, a touch panel, a fingerprint sensor, a button, or any other type of switch. FIG. 4A and FIG. 4B are schematic views of the second body 102 according to an embodiment of the disclosure. With reference to FIG. 4A and FIG. 4B, the notebook computer is taken as an example, and in the present embodiment, the motion detector 140 is disposed at the second body 102 and sandwiched between a surface C 105 and a surface D 106 of the second body 102. Besides, the motion detector 140 is configured to detect a trigger operation triggered by an external force (e.g., a pressing force, a pulling force, pressure, etc.), and the trigger operation may be a vibration, a knocking action, a pressing action, a pulling action, or the like, which is determined by the type of the motion detector 140.

The processor 150 is coupled to the first screen 110, the second screen 120, the posture detector 130, the motion detector 140, and an input apparatus 160. The processor 150 may be a central processing unit (CPU), a programmable general-purpose or special-purpose microprocessor, a digital signal processor (DSP), a programmable controller, an application specific integrated circuit (ASIC), any other similar device, or a combination of said devices. In an embodiment of the disclosure, the processor 150 is configured to perform all operations of the electronic apparatus 100 and can load and execute various types of software programs/modules, files, and data.

Figure 5:
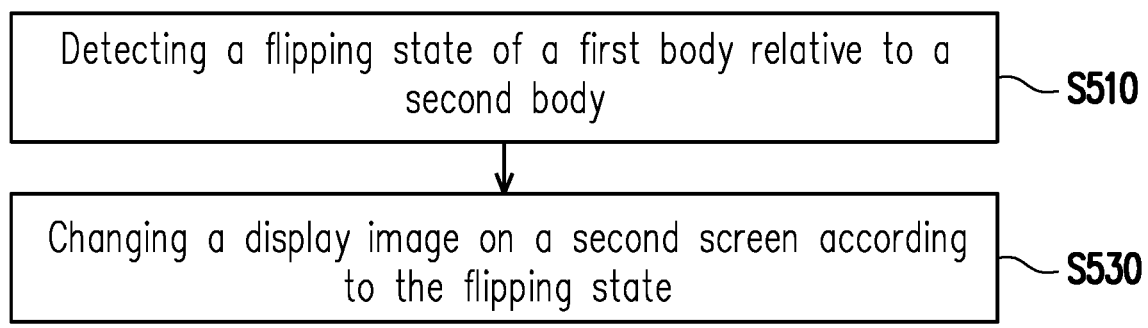
FIG. 5 is a flowchart of a control method according to an embodiment of the disclosure.

The input apparatus 160 can be a keyboard, a touch panel, a mouse button, a pointing stick, a trackball, and so on. With reference to FIG. 4A and FIG. 4B, the input apparatus 160 is, for instance, a keyboard, and the input apparatus 160 and the motion detector 140 are both disposed at the second body 102. It should be mentioned that the location where the motion detector 140 is disposed as shown in FIG. 4A and FIG. 4B is determined to facilitate the user's operation. For instance, the user often operates the input apparatus 160, and the location where the motion detector 140 is disposed as shown in FIG. 5 is about the location where the user's palm leans while operating the input apparatus 160. However, in other embodiments, the motion detector 140 may also be disposed at any other location on the second body 102 or even on the first body 101.

To better understand the operating process provided in one or more embodiments of the disclosure, several embodiments will be exemplified below to elaborate the operating process of the electronic apparatus 100. The devices and modules in the electronic apparatus 100 are applied in the following embodiments to explain the control method provided herein. Each step of the control method can be adjusted according to actual implementation situations and should not be limited to what is described herein.

Figure 2C:
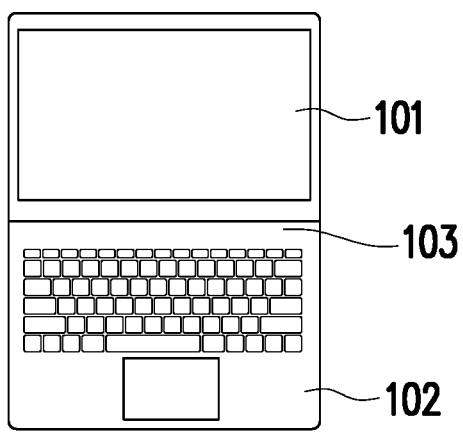
Figure 2C:
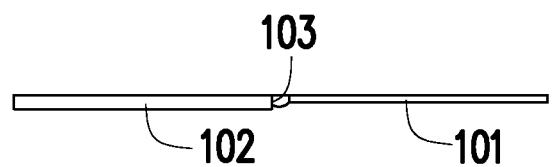
Figure 2D:
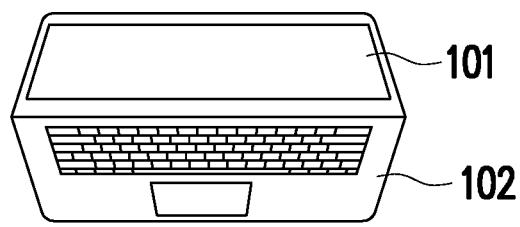
Figure 2D:
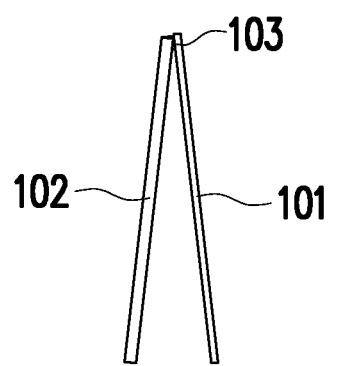

FIG. 5 is a flowchart of a control method according to an embodiment of the disclosure. With reference to FIG. 5, the processor 150 detects the flipping state of the first body 101 relative to the second body 102 through the posture detector 130 (step S510). Specifically, with reference to FIG. 2A to FIG. 2D, after the first body 101 and the second body 102 are opened (as shown in FIG. 2B to FIG. 2D), the first body 101 is flipped with respect to the connection member 103 as an axial center. The posture detector 130 obtains raw data (including sensing values), such as acceleration, angular velocity, and/or orientation according to its implementation manner, and the processor 150 can determine, according to the raw data, the flipping state of the first body 101 relative to the second body 102. The flipping state is, for instance, an included angle between one side of the first body 101 (where the second screen 120 can be disposed) and one side of the second body 102 (where the input apparatus 160 can be disposed) centered on the connecting member 103, and this flipping state may also be a spatial orientation of the second screen 120. For instance, a plane where the electronic apparatus 100 shown in FIG. 2A and FIG. 2B is disposed is defined as an x-y plane, a left to right direction shown in said drawings is defined as x-axis, an up to down direction shown in said drawings is defined as y-axis, and an axial direction perpendicular to the x-y plane is defined as z-axis. The processor 150 can, based on changes to the sensing values of the posture detector 130 in the x-axis and/or the z-axis, determine the orientation of the second screen 120 or the included angle between the first body 101 and the second body 102 (given that the second body 102 is substantially placed horizontally) through looking up a table, transition function, etc.

Figure 6A:
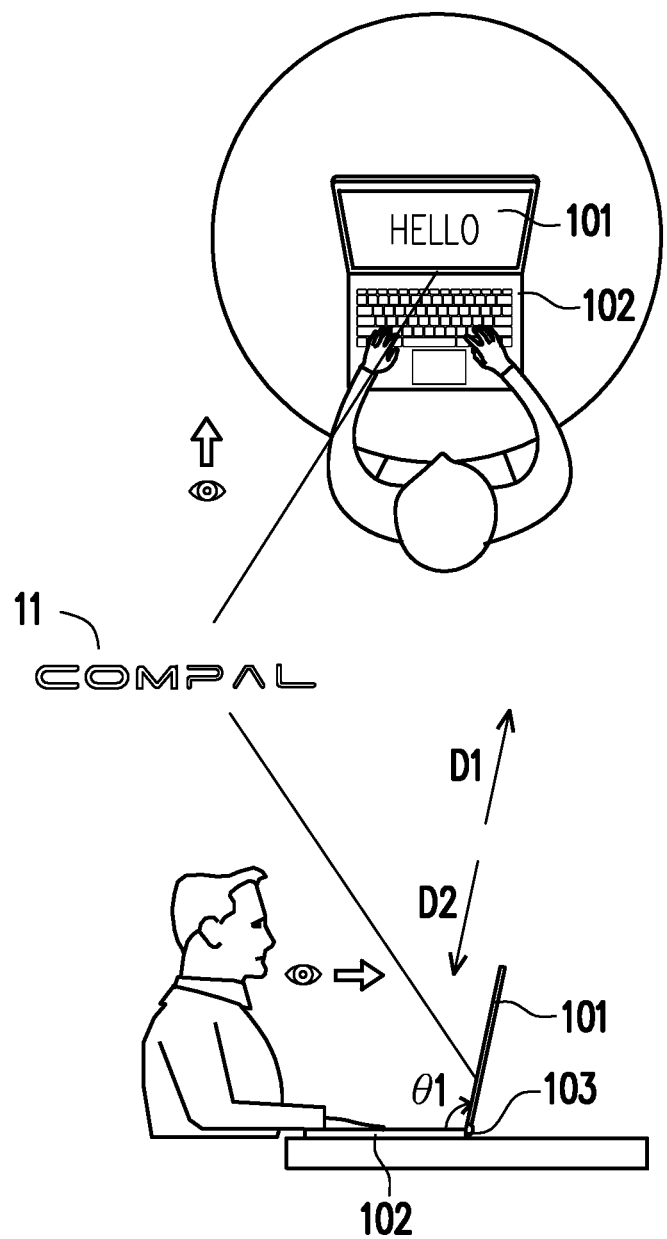
FIG. 6A to FIG. 6C are schematic views of a flipping action of a body according to an embodiment of the disclosure.
Figure 6B:
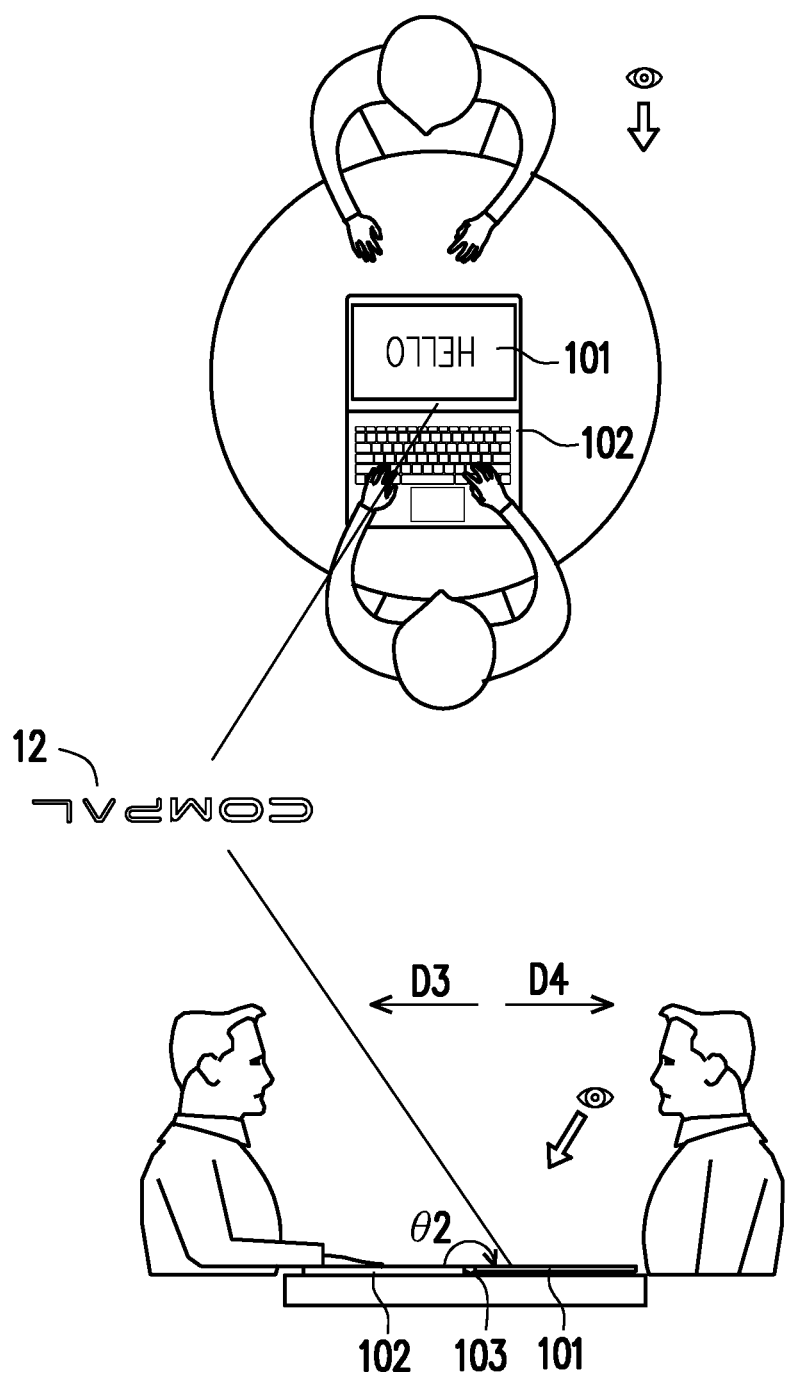
Figure 6C:
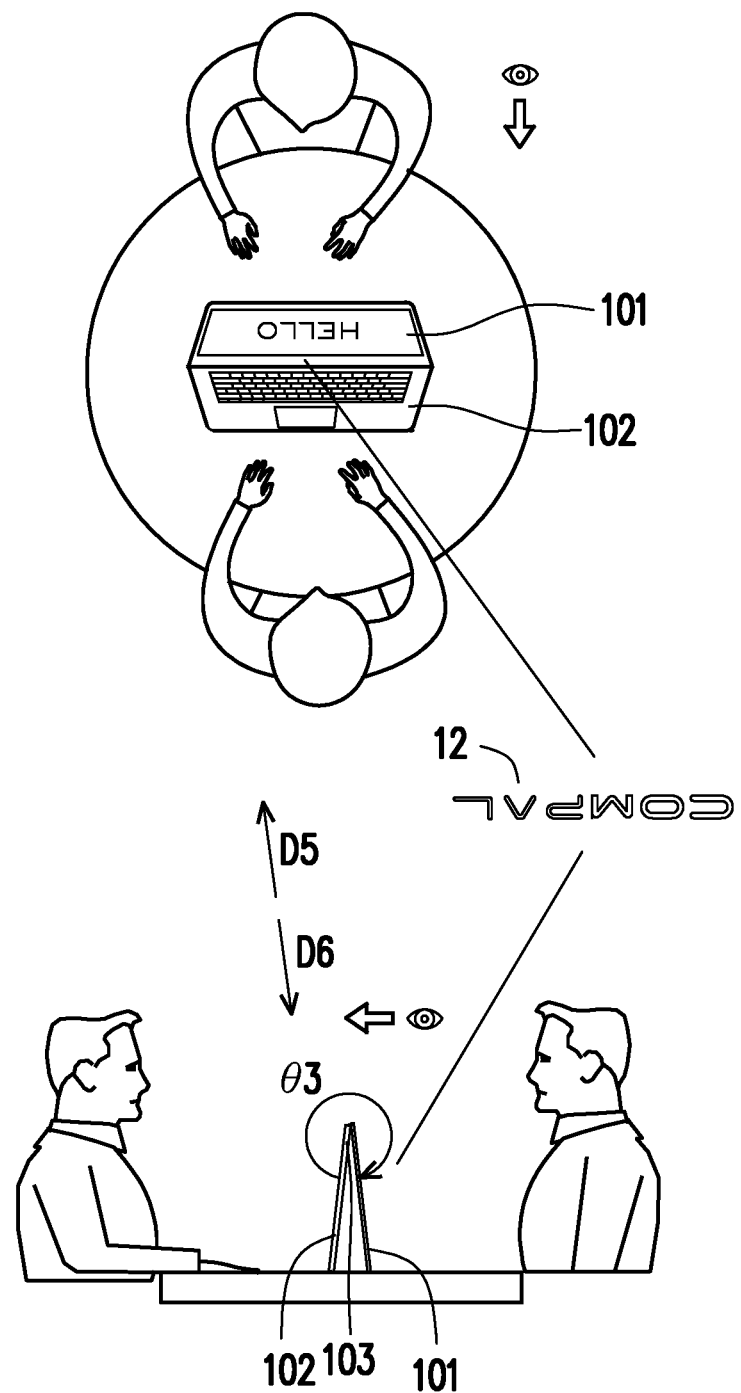

The processor 150 then changes a display image on the second screen 120 according to the determined flipping state (step S530). Specifically, the user often flips the first body 101, so that the first screen 110 and the second screen 120 can face the viewer. FIG. 6A to FIG. 6C are schematic views of a flipping action of a body according to an embodiment of the disclosure. With reference to FIG. 6A, when an included angle θ1 between the first body 101 and the second body 102 is within a range from approximately 0 degree to 170 degrees, the first screen 110 and the second screen 120 are often observed by a user (located at the left-hand side of the lower part of FIG. 6A) of the input apparatus 160. If it is intended to have the user observe the first screen 110 and the second screen 120 in a positive direction, up direction of the display image should be defined as being in a direction D1 from a center of the display image to be away from the center of the connection member 103, while down direction of the display image should be defined as being in a direction D2 from the center of the display image to the center of the connection member 103.

With reference to FIG. 6B, when an included angle θ2 between the first body 101 and the second body 102 is within a range from approximately 170 degree to 180 degrees, the first screen 110 and the second screen 120 are often observed by the viewer opposite to the user, i.e., the viewer is located at the right-hand side of the lower part of FIG. 6B and opposite to the user at the left-hand side. If it is intended to have the viewer observe the first screen 110 and the second screen 120 in the positive direction, the up direction of the display image should be defined as being in a direction D3 from a center of the display image to the center of the connection member 103, while the down direction of the display image should be defined as being in a direction D4 from the center of the display image to be away from the center of the connection member 103. That is, compared to the display image shown in FIG. 6A, the display image shown in FIG. 6B is rotated by 180 degrees, and the display image is observed by the user in a reverse direction.

With reference to FIG. 6C, when the included angle θ3 between the first body 101 and the second body 102 is within a range from approximately 180 degree to 360 degrees, the first screen 110 and the second screen 120 are often observed by the viewer opposite to the user, i.e., the viewer is located at the right-hand side of the lower part of FIG. 6C and opposite to the user at the left-hand side. If it is intended to have the viewer observe the first screen 110 and the second screen 120 in the positive direction, the up direction of the display image should be defined as being in a direction D5 from a center of the display image to the center of the connection member 103, while the down direction of the display image should be defined as being in a direction D6 from the center of the display image to be away from the center of the connection member 103. That is, compared to the display image shown in FIG. 6A, the display image shown in FIG. 6C is rotated by 180 degrees, and the display image is observed by the user in a reverse direction.

In response to said application scenarios, when the flipping state of the first body 101 relative to the second body 102 is that an included angle is changed, the processor 150 rotates the display image of the second screen 120. The included angle refers to an angle between the side of the first body 101 where the second screen 120 is disposed and one side of the second body 102, e.g., the included angles θ1 to θ3 depicted in FIG. 6A to FIG. 6C.

In an embodiment of the disclosure, on the condition that the second body 102 is substantially placed horizontally, when the included angle between the first body 101 and the second body 102 is changed from the range from 0 degree to 170 degrees to the range from 171 degrees to 360 degrees, the processor 150 can rotate the display image on the second screen 120 by 180 degrees. Besides, when the included angle between the first body 101 and the second body 102 is changed from the range from 171 degrees to 360 degrees to the range from 0 degree to 170 degrees, the processor 150 can rotate the display image 180 on the second screen 120 by 180 degrees. The two ranges from 0 degree to 170 degrees and 171 degrees to 360 degrees are not overlapped.

FIG. 6A to FIG. 6C are taken as an example. With reference to FIG. 6A, when the included angle θ1 between the first body 101 and the second body 102 is within the range from 0 degree to 170 degrees, the direction D1 is defined as the up direction, the direction D2 is defined as the down direction, and the display image 11 is displayed on the second screen 120 in the positive direction. With reference to FIG. 6B, when the included angle θ2 between the first body 101 and the second body 102 is within the range from 170 degrees to 180 degrees (within the range from 171 degrees to 360 degrees), the direction D3 is defined as the up direction, the direction D4 is defined as the down direction, and the display image 12 is displayed on the second screen 120 in the reverse direction as compared to the display image 11 shown in FIG. 6A, i.e., rotated by 180 degrees. With reference to FIG. 6C, when the included angle θ3 between the first body 101 and the second body 102 is within the range from 180 degrees to 360 degrees (within the range from 171 degrees to 360 degrees), the direction D5 is defined as the up direction, the direction D6 is defined as the down direction, and the display image 13 is displayed on the second screen 120 in the reverse direction as compared to the display image 11 shown in FIG. 6A, i.e., rotated by 180 degrees. That is, when the included angle between the first body 101 and the second body 102 is within the range from 0 degree to 170 degrees, the display image is displayed on the second screen 120 in a positive direction; when the included angle between the first body 101 and the second body 102 is within the range from 170 degrees to 360 degrees, the display image is displayed on the second screen 120 in the reverse direction.

If the display image on the second screen 120 includes logos, shortcut, drawings, and so on, note that the information can be displayed in the positive direction for the current viewer. For instance, the logos can be continuously displayed in the positive direction for easy identification.

It should be mentioned that the two ranges from 0 degree to 170 degrees and from 171 degrees to 360 degrees merely serve as examples for explanation; in other embodiments, these two ranges may be changed. Besides, the display image may be rotated by 180 degrees or other degrees. For instance, if the included angle is, for instance, within the range from 170 degrees to 180 degrees, the display image can also be rotated by 90 degrees or 270 degrees, so that the user and the viewer opposite to the user can observe the display image at the same time. In another aspect, the processor 150 can also rotate the display image on the second screen 120 directly according to the spatial orientation of the second screen 120. For instance, when the back of the second screen 120 faces the plane where the first body 101 is placed, the display image on the second screen 120 is rotated by 180 degrees. That is, in response to the different flipping states of the first body 110, the display image on the second screen 120 may be displayed in different reverse directions.

Figure 7A:
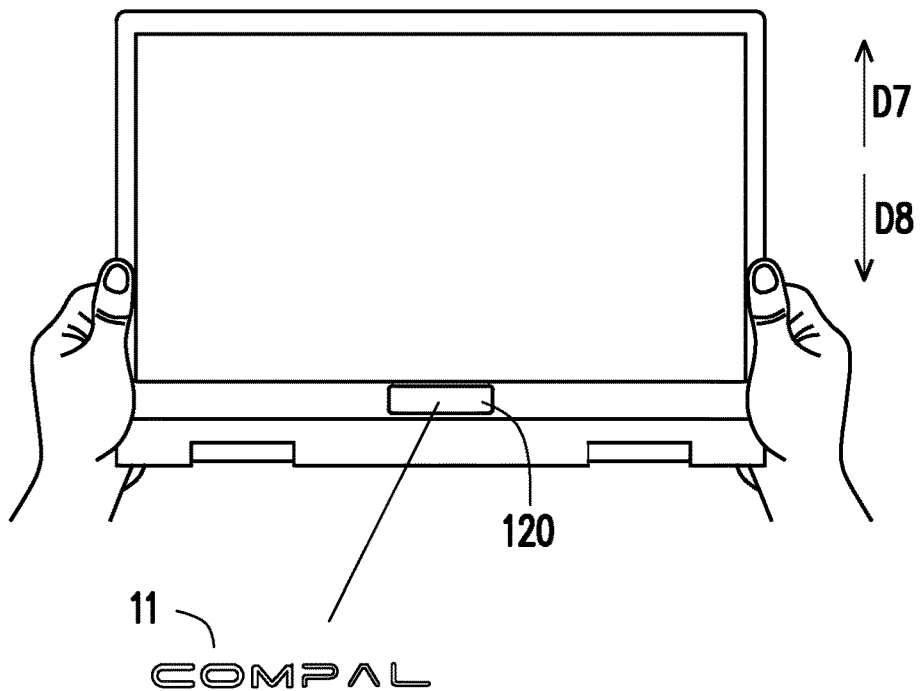
FIG. 7A and FIG. 7B are schematic views of a rotation of a body according to an embodiment of the disclosure.
Figure 7B:
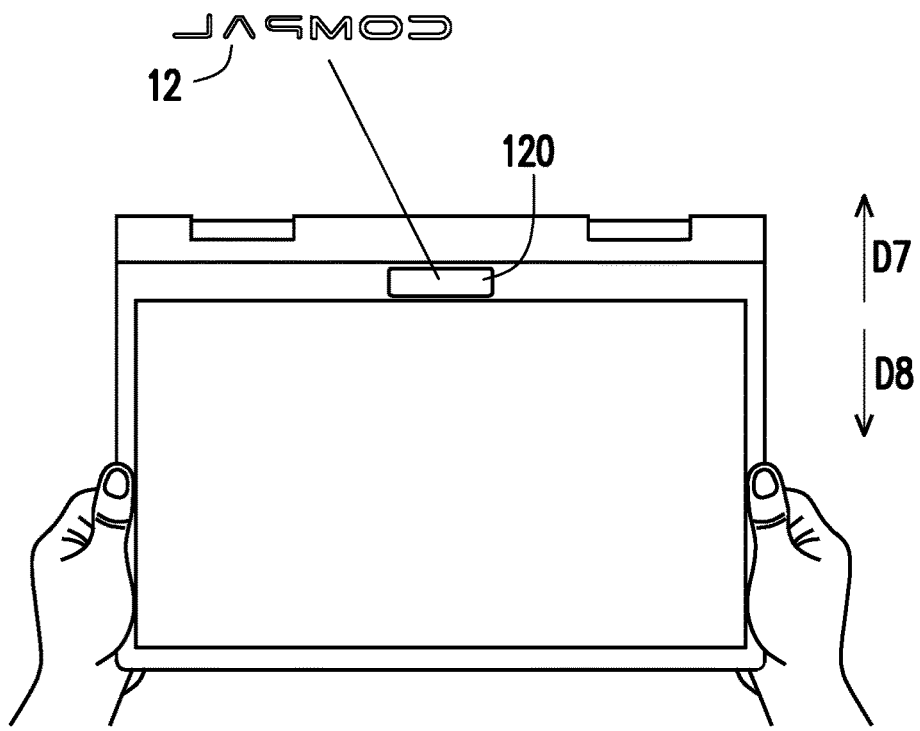

In addition to the flipping state provided in the previous embodiments, note that the electronic apparatus 100 may have other operating postures or operating state. FIG. 7A and FIG. 7B are schematic views of a rotation of a body according to an embodiment of the disclosure. With reference to FIG. 7A, when an included angle between the first body 101 and the second body 102 is approximately 360 degrees (i.e., when the back side of the first body 101 where the second screen 120 is disposed leans against or approaches the second body 102), the user may rotate the electronic apparatus 100 in a clockwise or counterclockwise manner. For instance, as shown in FIG. 7A (where the second screen 120 is located below the first screen 110), the electronic apparatus 100 is rotated by 180 degrees and is then in the state shown in FIG. 7B (the second screen 120 is located above the first screen 110).

In response to said scenario of rotation, the processor 150 further detects the rotation state of the first body 101 on an imaginary plane through the posture detector 130. The imaginary plane is parallel to the side of the first body 101 where the second screen 120 is disposed. As exemplarily shown in FIG. 7A, a plane parallel to the plane of the figure is the imaginary plane. For instance, a plane where the second screen 120 shown in FIG. 7A is disposed is defined as an x-y plane, a left to right direction shown in said figure is defined as x-axis, and an up to down direction shown in said figure is defined as y-axis. The processor 150 can, based on changes to the sensing values of the posture detector 130 in the x-axis and/or the y-axis, determine the rotation posture or state/orientation of the second screen 120 through looking up a table, transition function, etc. If the flipping state is that an included angle between the first body 101 and the second body 102 is a rotation trigger angle of 360 degrees, the processor 150 can determine whether there is a change of direction to the rotation state. That is, when the back side of the first body 101 and the back side of the second body 102 are closed (e.g., a tablet mode, and FIG. 2A shows the front side of the first body 101 and the front side of the second body 102 are closed), the processor 150 is then required to determine the rotation state of the first body 101. Next, when there is a change of direction to the rotation state, the processor 150 rotates the display image on the second screen 120. It should be mentioned that the rotation trigger angle can still be changed according to actual demands.

FIG. 7A and FIG. 7B are taken as an example. With reference to FIG. 7A, in the display image 11 on the second screen 120, the direction D7 is defined as the up direction, and the direction D8 is defined as the down direction. With reference to FIG. 7B, after the first body 101 is flipped by 180 degrees in the display image 12 on the second screen 120, the direction D8 is defined as the top, and the direction D7 is defined as the bottom, i.e., the display image 12 is the display image 11 rotated by 180 degrees, so that the viewer opposite to the user can observe the display image 11 in a positive direction.

In the present embodiment, note that the processor 150 can determine that the display image 11 is displayed in the positive direction when the first body 101 is rotated by 0 degree to 169 degrees as compared to the rotation state shown in FIG. 7A (the direction D7 is defined as being at 0 degree), and that the display image 12 is displayed in the reverse direction when the first body 101 is rotated by 170 degrees to 360 degrees as compared to the rotation state shown in FIG. 7A. According to other embodiments, the ranges of 0 degree to 169 degrees and 170 degrees to 360 degrees can be changed. For instance, when the rotation state is that the first body 101 rotated by 0 degree to 90 degrees and 270 degrees to 360 degrees as compared to the first body shown in FIG. 7A, the display image 11 is displayed in the positive direction, and the display image 12 is displayed in the reverse direction when the first body 101 is rotated by 91 degrees to 269 degrees as compared to the rotation state shown in FIG. 7A. Besides, the display image on the second screen 120 may also be an image rotated by 90 degrees or 270 degrees relative to the display image 11. For instance, if the rotation state is that the first body 101 is rotated by 90 degrees as compared to the first body shown in FIG. 7A (the direction D7 is defined as being at 0 degree), the display image 11 is rotated by 90 degrees.

Figure 8:
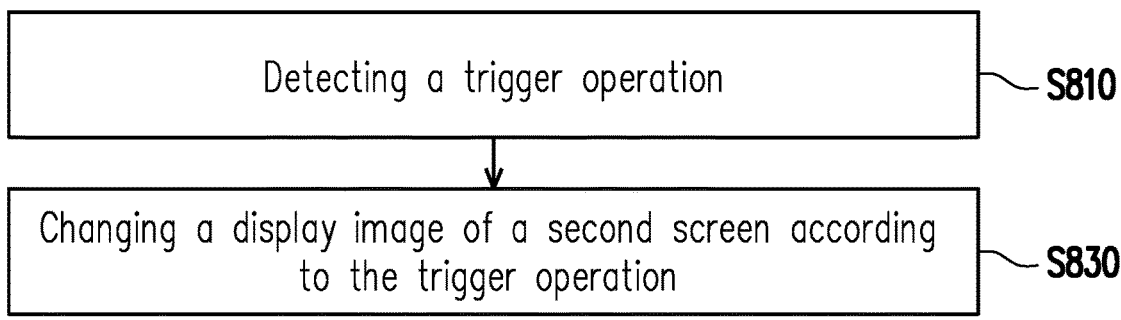
FIG. 8 is a flowchart of a control method according to another embodiment of the disclosure.

It should be mentioned that the change to the display image as provided in the previous embodiments means rotating the display image on the second screen 120 by different angles. To enhance the application of the second screen 120, the function of switching to different display content is also provided in one or more embodiments of the disclosure. FIG. 8 is a flowchart of a control method according to another embodiment of the disclosure. With reference to FIG. 8, the processor 150 can detect a trigger operation triggered by an external force through the motion detector 140 (step S810). According to the manner in which the motion detector 140 is implemented, the trigger operation may be a knocking action, a vibration, a touching action, a pushing/pulling action, or the like. The motion detector 140 is, for instance, a vibration sensor, and when the user knocks the second body 102, for instance, the processor 150 can determine the vibration condition (i.e., the operation triggered by the external force) on the second body 102 through the motion detector 140.

According to the trigger operation, the processor 150 can change the display image of the second screen 120 (step S830). Particularly, when the processor 150 determines that the operation of detecting the external force through the motion detector 140 complies with a default trigger operation (e.g., within 2 seconds, performing two knocking actions, performing three touching actions, or moving to a first position through performing the pulling action within 2 seconds), the processor 150 activates corresponding functions and displays the content through the display image on the second screen 120.

Figure 9:
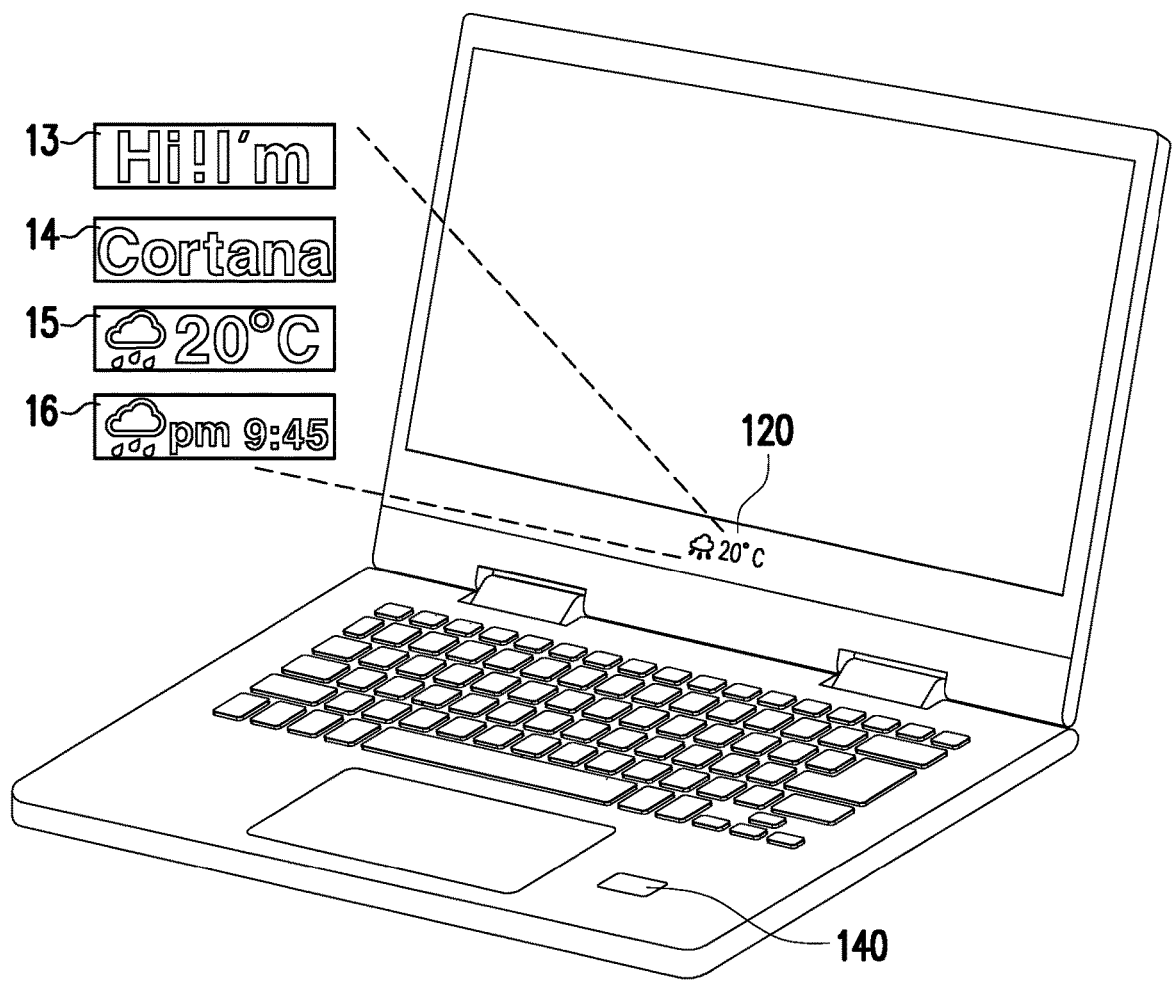
FIG. 9 illustrates display content corresponding to a trigger operation in an example.

FIG. 9 illustrates display content corresponding to a trigger operation in an example. With reference to FIG. 9, it is assumed that the motion detector 140 is the vibration sensor, and the trigger operation refers to two knocking actions. The motion detector 140 can detect the vibration state of the second body 102 knocked by the user's hand. When the processor 150 determines that the vibration state complies with the condition of performing two knocking actions, the processor 150 activates the voice assistant, controls the second screen 120 to sequentially display the display images 13 and 14, and displays the display images 15 and 16 associated with temperature, weather, or current time.

In addition to the display of single information, the processor 150 can provide other settings of more trigger operations. In an embodiment, the processor 150 can determine content of the display image on the second screen 120 according to at least one of operating time and operating number of times of the trigger operation. For instance, the processor 150 can provide an application program for a user to set the trigger operation. The operating time of the trigger operation can be modified. For instance, an external force may be exerted to extend the time, the operation may be performed within a specific period of time, the time interval between two operations, and so on. The operating number of times of the trigger operation can also be modified. For instance, the operation may be performed repetitively, continuously, or in another manner. The combination of different operating time and/or operating number of times may correspond to one set of trigger operation, the corresponding function (for the user to modify or set in advance) may be activated, and the corresponding content may be displayed on the second screen 120. Namely, when the operating time and/or the operating number of times of the trigger operation is different, the content of the display image on the second screen 120 is different. As such, simple information can be displayed rapidly through performing the simple trigger operation.

For instance, Table (1) is a lookup table of the settings of the trigger operation and the display of information.

TABLE (1)

| | |
|---|---|
| Time intervals | 0.5/1/1.5/2 seconds |
| One knocking action | Activate voice assistant |
| Two knocking actions | Weather information |
| Three knocking actions | Current time |
| Four knocking actions | Remaining power capacity |
| Selection of number of times of knocking actions | Selection of function |

Figure 10:
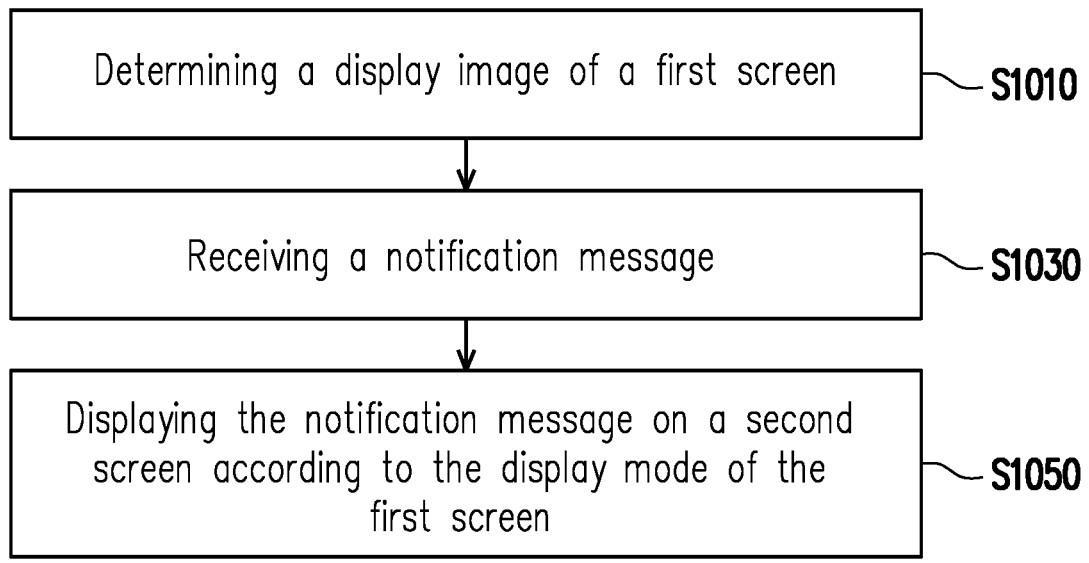
FIG. 10 is a flowchart of a control method according to another embodiment of the disclosure.

In addition to the corresponding display of the content on the second screen 120 through the triggering operation triggered by the external force, it is also likely to actively display a received notification message on the second screen 120. FIG. 10 is a flowchart of a control method according to another embodiment of the disclosure. With reference to FIG. 10, the processor 150 determines a display mode of the display image of the first screen 110 (step S1010). The display mode is associated with a size of a display program image. For instance, the image of the program is displayed in a full-screen mode, a maximized window mode, a minimized window mode, and so on. The processor 150 can then receive a notification message through a communication transceiver, a satellite positioning device, or a built-in timer (step S1030). The notification message is, for instance, a push notification of an email, a message, or a program received by the communication transceiver, a notification triggered when the satellite positioning device confirms an identified location, or a reminder or a conference notification triggered at a specific time set by the timer. When the notification message is received, the processor 150 can display the notification message on the second screen 120 according to the display mode of the first screen 110 (step S1050). In the present embodiment, when the display mode of the first screen 110 is the full-screen mode, the processor 150 displays the content or corresponding patterns of the notification message on the second screen 120. When the display mode of the first screen 110 is not the full-screen mode (minimize the window or disable the full-screen mode), the processor 150 displays the content associated with the notification message on the first screen 110 and does not display the notification message on the second screen 120/disables the display of the notification message (but other logos, background images, or the like can be disposed, or the second screen 120 may be turned off or display nothing). According to the user's requirements, the display mode of the first screen 110 can be switched to a full-screen-off mode or a minimized window mode; at this time, the second screen 120 need not display the notification message, and the user is able to directly observe the processing content associated with the notification message on the first screen 110.

Figure 11:
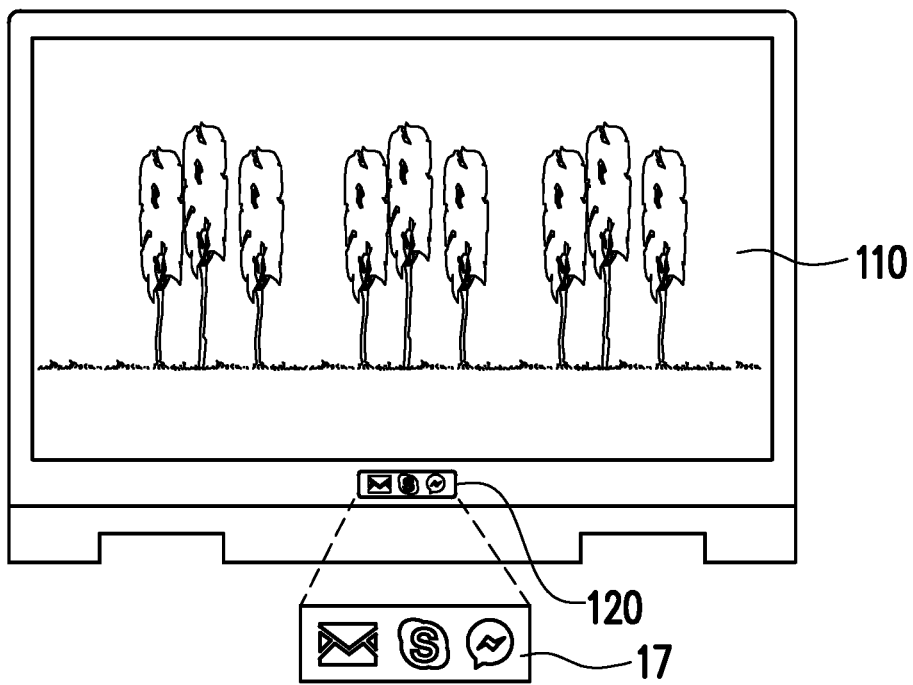
FIG. 11 illustrates display content corresponding to a notification message in an example.

FIG. 11 illustrates display content corresponding to a notification message in an example. With reference to FIG. 11, it is assumed that the first screen 110 displays a movie in the full-screen display mode. At this time, the processor 150 receives the email and/or the instant message and can then display the corresponding pattern through the display image 17 on the second screen 120. The user can observe whether the notification message is received through the second screen 120, which poses no impact on the display image on the first screen 110.

In other embodiments, note that the processor 150 can also display the content associated with the notification message on the second screen 120 while the display mode of the first screen 110 is the maximized window mode or while the window is in other sizes.

To sum up, according to the electronic apparatus and the control method thereof provided in one or more embodiments, the display orientation of the second screen can be flipped according to the flipping state of the first body where the second screen is disposed relative to the second body. When the included angle between the first body and the second body is approximately 360 degrees, the display orientation of the second screen can be rotated according to the rotation state of the electronic apparatus on a plane in one or more embodiments of the disclosure. As such, the viewer can continuously observe the display image on the second screen in the positive direction. The display image on the second screen can be the logo, information, and the notification message. When the trigger operation is triggered or when the notification message is received, the corresponding content is displayed on the display image. As such, simple information can be obtained rapidly through performing the simple operation, and the user can be informed without interrupting the first screen in use.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic apparatus, comprising:
    a first body;
    a second body, movably connected to the first body;
    a first screen;
    a second screen, the first screen and the second screen being disposed on one side of the first body;
    a posture detector, disposed at the first body and configured to detect a flipping state of the first body relative to the second body; and
    a processor, coupled to the first screen, the second screen, and the posture detector,
        wherein an included angle exists between one side of the second body and the one side of the first body provided with the first and second screens, and
        wherein the processor rotates a display image on the second screen according to the flipping state in response to the flipping state being that the included angle is changed between a range of a first angle and a range of a second angle or in response to the flipping state being that the included angle is in a rotation trigger angle,
        wherein in response to a receipt of a notification message, the processor displays the notification message on the second screen according to a display mode of the first screen, and the display mode is associated with a size of a display program image,
        when the display mode of the first screen is a full-screen mode, the processor displays content or corresponding patterns of the notification message on the second screen,
        when the display mode of the first screen is not the full-screen mode, the processor displays the content associated with the notification message on the first screen.

2. The electronic apparatus as recited in claim 1, wherein
    in response to the included angle within the range of the first angle being changed to be within the range of the second angle, the processor rotates the display image on the second screen by 180 degrees, and the range of the first angle and the range of the second angle are not overlapped; and
    in response to the included angle within the range of the second angle being changed to be within the range of the first angle, the processor rotates the display image on the second screen by 180 degrees.

3. The electronic apparatus as recited in claim 1, wherein the posture detector further detects a rotation state of the first body on an imaginary plane, the imaginary plane is parallel to the one side of the first body where the second screen is disposed, the processor determines whether there is a change of direction to the rotation state, and in response to the change of direction to the rotation state, the processor rotates the display image on the second screen.

4. The electronic apparatus as recited in claim 1, further comprising:

a motion detector, coupled to the processor and disposed at the second body, and configured to detect a trigger operation triggered by an external force, wherein the processor changes the display image on the second screen according to the trigger operation.

5. The electronic apparatus as recited in claim 4, wherein the processor determines content of the display image on the second screen according to at least one of operating time and operating number of times of the trigger operation.

6. A control method, adapted to an electronic apparatus, and comprising:

providing a first screen, a second screen, a first body, and a second body, wherein the first body is movably connected to the second body, the first screen and the second screen are disposed on one side of the first body, and an included angle exists between one side of the second body and the one side of the first body provided with the first and second screens;

detecting a flipping state of the first body relative to the second body;

rotating a display image on the second screen according to the flipping state in response to the flipping state being that the included angle is changed between a range of a first angle and a range of a second angle or in response to the flipping state being that the included angle is in a rotation trigger angle; and in response to a receipt of a notification message, displaying the notification message on the second screen according to a display mode of the first screen, wherein the display mode is associated with a size of a display program image, when the display mode of the first screen is a full-screen mode, displaying content or corresponding patterns of the notification message on the second screen, when the display mode of the first screen is not the full-screen mode, displaying the content associated with the notification message on the first screen.

7. The control method as recited in claim 6, wherein the step of rotating the display image on the second screen according to the flipping state comprises:

rotating the display image on the second screen by 180 degrees in response to the included angle within the range of the first angle being changed to be within the range of the second angle, wherein the range of the first angle and the range of the second angle are not overlapped; and rotating the display image on the second screen by 180 degrees in response to the included angle within the range of the second angle being changed to be within the range of the first angle.

8. The control method as recited in claim 6, wherein the step of rotating the display image on the second screen according to the flipping state comprises:

detecting a rotation state of the first body on an imaginary plane, wherein the imaginary plane is parallel to the one side of the first body where the second screen is disposed;

determining whether there is a change of direction to the rotation state; and rotating the display image on the second screen in response to the change of direction to the rotation state.

9. The control method as recited in claim 6, further comprising:

detecting a trigger operation triggered by an external force; and changing the display image on the second screen according to the trigger operation.

10. The control method as recited in claim 9, wherein the step of changing the display image on the second screen according to the trigger operation comprises:

determining content of the display image on the second screen according to at east one of operating time and operating number of times of the trigger operation.

* * * * *